(12) United States Patent
Weber et al.

(10) Patent No.: US 7,201,864 B2
(45) Date of Patent: Apr. 10, 2007

(54) ROTOMOLDING PROCESS WITH REDUCED CYCLE TIMES

(75) Inventors: Mark Weber, Calgary (CA); Philippa Hocking, Calgary (CA); Stephen John Brown, Calgary (CA); Christopher John Brooke Dobbin, Calgary (CA)

(73) Assignee: Nova Chemicals (International) S.A (CH)

( * ) Notice: Subject to any disclaimer, the term of this patent is extended or adjusted under 35 U.S.C. 154(b) by 120 days.

(21) Appl. No.: 10/886,928

(22) Filed: Jul. 8, 2004

(65) Prior Publication Data

US 2005/0017409 A1    Jan. 27, 2005

(30) Foreign Application Priority Data

Jul. 24, 2003    (CA) ................... 2435986

(51) Int. Cl.
*B29C 41/04*    (2006.01)

(52) U.S. Cl. ...................... 264/310; 264/319

(58) Field of Classification Search ................. 264/310
See application file for complete search history.

(56) References Cited

U.S. PATENT DOCUMENTS

| | | | |
|---|---|---|---|
| 3,214,422 A | 10/1965 | Mageli et al. ............. 260/94.9 |
| 3,645,992 A | 2/1972 | Elston ..................... 260/80.78 |
| 3,989,787 A * | 11/1976 | Scott et al. ................. 264/114 |
| 4,536,550 A * | 8/1985 | Moriguchi et al. ......... 525/240 |
| 5,064,802 A | 11/1991 | Stevens et al. ............. 502/155 |
| 5,082,902 A | 1/1992 | Gurevitch et al. .......... 525/240 |
| 5,324,800 A | 6/1994 | Welborn, Jr. et al. ....... 526/160 |
| 5,367,025 A | 11/1994 | Needham ................... 525/166 |
| 5,530,035 A | 6/1996 | Ferrero-Heredia .......... 521/170 |
| 5,530,055 A | 6/1996 | Needham ................... 524/528 |
| 5,532,282 A | 7/1996 | Needham ..................... 521/93 |
| 5,858,491 A * | 1/1999 | Geussens et al. ........... 428/36.9 |
| 6,005,053 A * | 12/1999 | Parikh et al. ............... 525/221 |
| 6,372,864 B1 | 4/2002 | Brown ......................... 526/65 |
| 6,444,733 B1 | 9/2002 | Stadler ....................... 524/100 |

OTHER PUBLICATIONS

Anunay Gupta and Urs Stadler, Influence of Stabilizers in Rotational Molding, presented at 22nd Annual Fall Meeting of the Association of Rotational Molders, Oct. 1997, U.S.A.

* cited by examiner

*Primary Examiner*—Christina Johnson
*Assistant Examiner*—Monica A Huson
(74) *Attorney, Agent, or Firm*—Kenneth H. Johnson

(57) ABSTRACT

The cycle time for a rotomolding process is improved through the use of a molding material comprising a blend of at least two polyethylenes having narrow molecular weight distributions and homogeneous comonomer distributions. Alternatively, the molding temperature may be reduced to conserve energy and reduce energy costs. The polyethylene blend also has a narrow molecular weight distribution of less than 3 and a density of from 0.930 to 0.950 g/cc. Rotomolded parts prepared from the blend composition have excellent impact resistance and are also resistant to warpage. A preferred process employs a blend composition which contains a blend component having a higher molecular weight and a lower density than another blend component—this blend may be used to prepare rotomolded parts with warpage resistance and improved environmental stress crack resistance (ESCR). A highly preferred process uses a blend composition which further contains a minor amount (from 0.5 to 10 weight %) of a third ethylene blend component which has a higher molecular weight and density—this highly preferred composition may be used to prepare rotomolded parts having warpage resistance, very good ESCR and comparatively high modulus (or stiffness).

5 Claims, No Drawings

ROTOMOLDING PROCESS WITH REDUCED CYCLE TIMES

FIELD OF THE INVENTION

This invention relates to a rotomolding process which uses a blend of thermoplastic ethylene copolymers having an aggregate molecular weight distribution of less than 3. The process offers reduced cycle times and/or reduced energy costs.

BACKGROUND OF THE INVENTION

Rotational molding, also known as rotomolding, is a well known process which is widely used to produce hollow plastic parts such as gasoline containers, garbage cans, agricultural storage vessels, septic tanks and sporting goods such as kayaks. The process is undertaken by loading a charge of finely divided plastic resin into the mold "shell", then rotating the mold (usually, on two axes) while heating it to a temperature above the melting point of the plastic resin. The melted plastic flows through the mold cavity under the forces caused by the rotation of the apparatus. The rotation continues for sufficient time to allow the molten plastic to cover the surface of the mold. The mold is then cooled to permit the plastic to freeze into a solid. The final stage of the molding cycle is the removal of the part from the rotomolding machine.

The time required to complete the molding cycle is a function of the bulk properties of the plastic which is being molded. For example, it is recognized by those skilled in the art that the plastic resin which is charged into the mold is preferably finely divided (i.e. ground into powder) and has a high bulk density and a narrow particle size distribution to facilitate the "free flow" of the resin.

It will also be appreciated that the physical properties of the rotomolded part are influenced by the use of a proper molding cycle time with "undercooked" parts having poor strength properties and "overcooked" parts suffering from poor appearance (a "burnt" color) and/or a deterioration of strength properties. It is desirable to have a short molding cycle (so as to improve the productivity of the expensive rotomolding machinery) and a broad "processing window" (i.e. the rotomolding composition ideally provides "properly cooked" parts in a short period of time but does not become "overcooked" for an extended period of time).

In addition, the properties of the rotomolded part are affected by the molecular structure of the polymer used to prepare the part. Physical properties of importance include stiffness (as indicated by the modulus of the part), environmental stress crack resistance (or "ESCR"), impact resistance and resistance to warpage.

Thermoplastic polyethylene copolymer is a commonly used plastic resin for the manufacture of rotomolded parts. Conventional polyethylene copolymer resin (which is generally prepared by the copolymerization of ethylene with a $C_{4 \text{ to } 10}$ alpha olefin in the presence of a chromium catalyst or a Ziegler Natta catalyst) is typically used. The alpha olefin comonomer produces "short chain branches" (SCB) in the copolymer. These SCB reduce the crystallinity of the copolymer (in comparison to a linear ethylene homopolymer) and the copolymers typically have improved impact resistance in comparison to homopolymers. These conventional polyethylenes may be referred to as "heterogeneous" in the sense that he polyethylene is actually a mixture of different polyethylene chains having significantly different molecular weights and comonomer distributions. Most notably, a conventional heterogeneous polyethylene copolymer resin generally contains three fractions:

i) a low molecular weight fraction having a high comonomer content (or high level of SCB)—this fraction is often referred to as "wax" or "extractables";

ii) a very high molecular weight fraction having little or no comonomer—this fraction is often referred to as "homopolymer"; and iii) a fraction of intermediate molecular weight and SCB content.

These conventional polyethylenes are well suited for rotomolding. For example, whilst not wishing to be bound by theory, it has been postulated that the high molecular weight "homopolymer" fraction may enhance the stiffness or modulus of the rotomolded parts. However, as may be expected, the physical properties of a finished part (which has been molded with a proper cycle time) are largely "set" by the molecular structure of the polyethylene copolymer used to prepare the part. This, in turn, often results in finished parts with a suboptimal balance of properties. Persons skilled in the art of rotational molding have addressed this problem by preparing blends of ethylene copolymers to produced parts have a more desirable balance of properties. For example, U.S. Pat. No. 5,082,902 (Gurevitch et al.) discloses a rotomolding composition prepared from 50 to 95% of a higher density ethylene copolymer with 5 to 50% of a lower density ethylene copolymer. The copolymers disclosed by Gurevitch et al. are conventional (heterogeneous) resins, and the blend components have significantly different densities.

The rotomolded parts described in the Gurevitch et al. patent are said to have better impact properties, improved warpage resistance and better ESCR in comparison to parts prepared from a single resin.

Similarly, U.S. Pat. No. 5,530,035 (Needham) teaches a rotomolding composition made from a blend of ethylene polymers having significant different densities.

More recently, homogeneous ethylene copolymers have become commercially available. These homogenous polymers have a uniform (or narrow) molecular weight distribution and a uniform comonomer distribution. This, in turn, causes the homogeneous copolymers to have a well defined melting point (in comparison to the heterogeneous polymers which have a melting point "range", or even multiple melting points).

The sharp melting point might have been expected to be advantageous for a rotomolding process. However, in practice, it has been found that parts prepared from a single homogeneous resin are prone to warpage and also generally have poor modulus or stiffness. Blends of heterogeneous ethylene copolymers with homogeneous ethylene polymers have been proposed as a means to resolve these problems and it is believed that some such blends are in commercial use. U.S. Pat. No. 5,858,491 (Gussens et al.) teaches the preparation of a hollow molded article from a polymer blend comprising homogenous ethylene copolymer having a low density and a heterogeneous ethylene polymer having a very high density.

Stehling et al. teach that blends of homogeneous ethylene copolymers having substantially different molecular weight (such that the molecular weight distribution of the blend is greater than 3) provide films with good tear strength. Stehling et al. do not teach that blends having a narrow molecular weight distribution are suitable for rotomolding.

We have now discovered that blends comprising at least two homogeneous ethylene copolymers having very similar molecular weight and density provide excellent rotomolding compositions. More particularly, we have discovered that a very large improvement is obtained in the physical properties of the finished parts is obtained through the use of blend components having only small differences in comonomer distribution and/or molecular weight.

SUMMARY OF THE INVENTION

In one embodiment of this invention, there is provided a rotomolding process comprising (i) preparing a polymer blend comprising a plurality of thermoplastic linear ethylene copolymer blend components wherein each blend component has a homogeneous comonomer distribution and a molecular weight distribution, Mw/Mn, of less than 3 and wherein said polymer blend has an overall molecular weight distribution, Mw/Mn, of less than or equal to about 3 and a density of from 0.930 g/cc to 0.950 g/cc; and (ii) subjecting said polymer blend to rotational molding.

The process provides the advantages of fast cycle times and/or reduced energy usage. Moreover, the rotomolded parts prepared according to this invention have excellent impact resistance and are resistant to warpage.

In a preferred embodiment of this invention, the rotomolding process employs a blend in which one blend component has both of a higher molecular weight and a lower density than a second blend component. Rotomolded parts prepared with such blends have improved ESCR as well as warpage resistance. In another preferred embodiment, a small amount (less than 10 weight %) of a high molecular weight high density blend component is included.

DETAILED DESCRIPTION OF PREFERRED EMBODIMENTS

Rotational molding technology is well known and is described in the literature. Reference may be made to U.S. Pat. No. 5,530,055 (Needham, the disclosure of which is incorporated herein by reference) for further details concerning the operation of a rotomolding process.

The rotomolding composition of this invention is prepared from a blend of ethylene copolymers (or "interpolymers")—yet the overall composition must have a narrow molecular weight distribution and therefore the composition "looks" more like a homogeneous polymer than the heterogeneous interpolymers which are commonly used for rotomolding applications. Descriptions of heterogeneous and homogeneous polymers are briefly set out below.

In general, the term ethylene copolymer (or "interpolymer"), as used herein, is meant to refer to a copolymer of ethylene with at least one alpha olefin monomer containing from 3 to 10 carbon atoms. Thus, ethylene homopolymers are excluded but terpolymers are included. The physical properties of such ethylene copolymers are influenced by their molecular weight, molecular weight distribution, comonomer content and comonomer distribution. It is well known that the use of such comonomers produces copolymers that generally have decreased density and crystallinity as the amount of incorporated comonomer increases.

Conventional (heterogeneous) ethylene copolymers which are prepared with a conventional Ziegler-Natta catalyst generally have a comparatively broad molecular weight distribution (as defined by dividing weight average molecular weight, Mw, by number average molecular weight, Mn—i.e. molecular weight distribution equals Mw/Mn) and a broad comonomer distribution. These resins typically contain at least three distinct polymer fractions, namely a small amount (generally less than 5 weight %) of a low molecular weight, high comonomer content material (also known as "wax"); a significant fraction (15 to 25 weight %) of material having a very high molecular weight and a low comonomer content (also known as "homopolymer"); with the remainder of the copolymer being of intermediate density and molecular weight.

This lack of uniformity with respect to molecular weight and comonomer distribution has several disadvantages for example, the "wax" fraction may limit the use of these interpolymers in applications which come into contact with food and the "homopolymer" fraction is often associated with the poor impact resistance of goods made with these interpolymers.

In contrast, the rotomolding compositions used in this invention are prepared from blend components having a narrow molecular weight distribution. Moreover, the overall rotomolding composition of this invention must also have a molecular weight distribution Mw/Mn of from 2.0 to 3.0 (preferably from 2.2 to 2.8). Thus, preferred rotomolding compositions used in this invention are characterized by having less than 2.0 weight % of low molecular weight, high comonomer content wax (i.e. for further clarity, less than 2.0 weight % of hexane extractables as determined by the test method established by the United States Food and Drug Administration and published under CFR 177.1520 (c)) and less than 10 weight % of high molecular weight homopolymer (i.e. for further clarity, less than 10 weight % of the rotomolding composition contains less than 1 short chain branch per 1000 carbon atoms as determined by Temperature Rising Elution Fractionation or TREF).

Thus, in summary, the rotomolding composition used in this invention must contain a plurality of blend components but the overall composition still has a narrow molecular weight distribution.

Preferred rotomolding compositions for use in this invention are further characterized by density and melt flow characteristics. Specifically, the preferred density range is from 0.930 to 0.950 grams per cubic centimeter and the preferred melt index ("$I_2$", as determined by ASTM D-1238, using a 2.16 kilogram load at a temperature of 190° C.) is from 1 to 7 grams per 10 minutes. Melt index might be regarded as a indicator of molecular weight, though an inverse relationship between the two exists. That is, as the molecular weight of the polymer increases, the flow index ($I_2$) decreases.

The compositions used in this invention contain at least two ethylene copolymer blend components. Each of these components may be prepared by the copolymerization of ethylene with a $C_{4\ to\ 20}$ alpha olefin in the presence of a catalyst system which produces homogenous polymers (i.e. as above, polymers with a narrow molecular weight distribution and narrow composition distribution). Exemplary catalyst systems include the vanadium catalyst system disclosed in U.S. Pat. No. 3,645,992 (Elston), "metallocene" catalysts (as disclosed, for example, in U.S. Pat. No. 5,324,800), "constrained geometry" catalysts (as disclosed, for example, in U.S. Pat. No. 5,064,802 Stevas et al.) and the phosphinimine catalyst systems described in the U.S. Pat. No. 6,372,864 (Brown et al.).

As previously noted, it is desirable to reduce the rotomolding cycle time so as to improve the productivity of the expensive machinery. It is further desirable to produce parts which have excellent environmental stress crack resistance; high ductility and good stiffness. This may be illustrated by considering a molded tank for liquids—the tank needs to be resistant to the elements; it should be resistant to impact (for example, it should not shatter when struck with a blunt object) and the tank needs to be stiff enough to maintain its shape when filled with liquid. Prior rotomolded tanks have achieved these required strength properties through the use of thick walls. The present rotomolded parts also offer the potential for reducing wall thickness while still maintaining strength.

It is known to prepare rotomolded parts with a single "homogeneous" resin (i.e. a resin with a uniform comonomer distribution). Homogeneous resins do not contain the "high density" fraction which exists in conventional Ziegler Natta ("Z/N") resins and, thus, a homogeneous resin will have a lower (and sharper) melting point than a Z/N resin of similar molecular weight and density. This, in turn may allow cycle times to be reduced using a single homogeneous resin (in comparison to the cycle time required for similar Z/N resin). However, the resulting parts are prone to warpage. In addition, the rotomolded parts prepared from homogeneous resins have poor stiffness in comparison to parts prepared from Z/N resins. Moreover, the ESCR of these parts is not as good as might be expected given the homogeneous distribution of the comonomer. The well defined melting point of the homogeneous resins used to prepare the present rotomolded parts may also assist with the fabrication of custom parts (in which thin molds with irregular shapes must be filled within tight tolerances).

Thus, the present invention generally provides a more "forgiving" rotomolding process with the above noted advantage of faster cook times (with a broad processing window, reduced warpage and excellent capability to meet tight tolerances).

The blend components may be prepared as distinct polymers in separate polymerization reactions and then blended together to provide the present compositions. The blend components may be blended using conventional mixing/blending equipment such as a single or twin sinew extruder; and internal batch mixer such as a bamburg mixer; or a continuous mixer such as a Farrel mixer. The mixing time and temperatures may be readily optimized by those skilled in the art without undue experimentation. As a guideline, mixing temperatures of from 150 to 250° C. are suitable and mixing times of 1–10 minutes may provide satisfactory results. Alternatively (and preferably), the blend components may be prepared in a multiple reactor polymerization system as disclosed in the Examples.

Typically, each blend component is a copolymer of ethylene with $C_{4 \text{ to } 8}$ alpha olefin such as butene-1, pentene-1, 4-methyl-1-pentene, hexene-1 or octene-1; with hexene-1 and octene-1 being most preferred.

As previously disclosed, the overall rotomolding composition of this invention has a narrow molecular weight distribution of less than 3.0. Preferred compositions are prepared with two blend components, each of which represents from 20 to 80 weight % of the total composition. It follows from these preferences that each of the two blend components has a similar molecular weight as well as a narrow molecular weight distribution (i.e. in the sense that the composition would have a molecular weight distribution of greater than 3.0 if the blend components had substantially different molecular weights or if one or both of the blend components had a broad molecular weight distribution).

In addition, it is preferred that each of the blend components has essentially the same density (which, as used herein, means that the difference in density between each of the blend components is less than 0.015 grams per cubic centimeter).

The rotomolding composition used in this invention have a relatively sharp and low melting point in comparison to a heterogeneous resin of similar average molecular weight and density. In this sense, the present rotomolding compositions are similar to a single homogeneous resin (i.e. a single homogeneous resin will also have a relatively sharp and low melting point in comparison to a conventional heterogeneous resin of similar average molecular weight and density). However, as illustrated in the examples, the rotomolding compositions used in this invention produce rotomolded parts which are resistant to warpage. In contrast, a rotomolded part prepared from a single homogeneous resin is prone to warp.

In a preferred embodiment, one rotomolding blend component has both of a higher molecular weight and a higher comonomer content (lower density) than another blend component. Rotomolded parts prepared from these compositions have excellent ESCR. It is particularly preferred to use from 25 to 35 weight % of the high molecular weight, lower density blend component and 65 to 75 weight % of the lower molecular weight blend component.

In another preferred embodiment, the rotomolding composition further contains a small amount (less than 10 weight %, most preferably less than 5%) of a third blend component having the highest molecular weight and highest density of any blend component. The use of third blend components may increase the stiffness of the rotomolded part (but also may reduce the ESCR somewhat).

Additives

Rotomolding compositions conventionally contain an additive package to protect the polymer from decomposing during the processing and/or exposure to the elements and to improve processing cycle times and windows. Reference is made to "Influence of Stabilizers in Rotational Molding" (Gupta and Stadler; paper presented at 22nd Annual Fall Meeting of the Association of Rotational Molders; 5–8 October 1997) for details.

Preferred additive systems contain a hindered Amine Light Stabilizers (or HALS); a phosphite or phosphonite (especially a diphosphite as illustrated in the examples); and at least one third component selected from the group consisting of hindered phenols, hydroxylamines, amine oxides and lactones.

The use of a phenolic antioxidant often produces color in the rotomolded part—particularly after aging and/or exposure to combustion gases ("gas fading"). This may be reduced by using a "phenol free" additive system as described in U.S. Pat. No. 6,444,733. Additionally, we have discovered that the compositions of this invention may be stabilized with certain phenols which contain an isocyanurate structure and still be resistant to color generation.

The additives may be incorporated into the compositions using mixing equipment such as an extruder, or internal batch mixer (also known as a banbury mixer). The additive may be added "neat" (i.e. directly to the resin); as a "masterbatch" (i.e. by premixing the additives with a small amount of polyethylene which is subsequently mixed with the bulk of the composition); or as "preblends" (i.e. mixtures of the additives). Exemplary additives are set out below.

1. Antioxidants 1.1 Alkylated Mono-Phenols

For example, 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4 isobutylphenol; 2,6-dicyclopentyl-4-methylphenol; 2-(.alpha.-methylcyclohexyl)-4,6 dimethylphenol; 2,6-di-octadecyl-4- methylphenol; 2,4,6,-tricyclohexyphenol; and 2,6-di-tert-butyl-4-methoxymethylphenol.

1.2 Alkylated Hydroquinones

For example, 2,6di-tert-butyl-4-methoxyphenol; 2,5-di-tert-butylhydroquinone; 2,5-di-tert-amyl-hydroquinone; and 2,6diphenyl-4-octadecyloxyphenol.

1.3 Hydroxylated Thiodiphenyl Ethers

For example, 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

1.4 Alkylidene-Bisphenols

For example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl) phenol); 2,2'-methylene-bis-(4-methyl-6-cyclohexylphenol); 2,2'-methylene-bis-(6-nonyl-4-methylphenol); 2,2'-methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzyl)-4-nonylphenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl-2-methylphenol); 1,1-bis-(5-tert-butyl-4-hydroxy-2-methylphenol)butane 2,6-di-(3-tert-butyl-5-methyl-2-hydroxybenzyl)-4-methylphenol; 1,1,3-tris-(5-tert-butyl-4-hydroxy-2-methylphenyl)butane; 1,1-bis-(5-tert-butyl-4-hydroxy2-methylphenyl)-3-dodecyl-mercaptobutane; ethyleneglycol-bis-(3,3,-bis-(3'-tert-butyl-4'-hydroxyphenyl)-butyrate)-di-(3-tert-butyl-4-hydroxy-5-methylpenyl)-dicyclopentadiene; di-(2-(3'-tert-butyl-2'hydroxy-5'methylbenzyl)-6-tert-butyl-4-methylphenyl) terephthalate; and other phenolics such as monoacrylate esters of bisphenols such as ethylidiene bis-2,4-di-t-butylphenol monoacrylate ester.

1.5 Benzyl Compounds

For example, 1,3,5-tris-(3,5-di-tert-butyl-4-hydroxybenzyl)-2,4,6-trimethylbenzene; bis-(3,5-di-tert-butyl-4-hydroxybenzyl)sulfide; isooctyl 3,5-di-tert-butyl-4-hydroxybenzyl-mercaptoacetate; bis-(4-tert-butyl-3hydroxy-2,6-dimethylbenzyl)dithiol-terephthalate; 1,3,5-tris-(3,5-di-tert-butyl-4,10 hydroxybenzyl)isocyanurate; 1,3,5-tris-(4-tert-butyl-3-hydroxy-2,6-dimethylbenzyl)isocyanurate; dioctadecyl 3,5-di-tert-butyl-4-hydroxybenzylphosphonate; calcium salt of monoethyl 3,5-di-tertbutyl-4-hydroxybenzylphosphonate; and 1,3,5-tris-(3,5-dicyclohexyl-4-hydroxybenzyl)isocyanurate.

1.6 Acylaminophenols

For example, 4-hydroxy-lauric acid anilide; 4-hydroxystearic acid anilide; 2,4-bis-octylmercapto-6-(3,5-tert-butyl-4-hydroxyanilino)-s-triazine; and octyl-N-(3,5-di-tert-butyl-4-hydroxyphenyl)-carbamate.

1.7 Esters of beta-(5-tert-butyl-4-hydroxy-3-methylphenyl)-propionic acid with Monohydric or Polyhydric Alcohols For example, methanol; diethyleneglycol; octadecanol; triethyleneglycol; 1,6-hexanediol; pentaerythritol; neopentylglycol; tris-hydroxyethyl isocyanurate; thidiethyleneglycol; and dihydroxyethyl oxalic acid diamide.

1.8 Amides of beta-(3.5-di-tert-butyl-4hydroxyphenol)-propionic acid

For example, N,N'-di-(3,5-di-tert-butyl-4-hydroxyphenylpropionyl)-hexamethylendiamine; N,N'-di-(3,5-di-tert-butyl-4-hydroxyphenylpropionyl)trimethylenediamine; and N,N'-di(3,5-di-tert-butyl-4-hydroxyphenylpropionyl)-hydrazine.

2. UV Absorbers and Light Stabilizers

2.1 2-(2'-hydroxyphenyl)-benzotriazoles

For example, the 5'-methyl-,3'5'-di-tert-butyl-,5'-tert-butyl-,5'(1,1,3,3-tetramethylbutyl)-,5-chloro-3',5'-di-tert-butyl-,5-chloro-3'-tert-butyl-5'-methyl-3'-sec-butyl-5'-tert-butyl-,4'-octoxy,3',5'-ditert-amyl-3',5'-bis-(alpha, alpha-di methylbenzyl)-derivatives.

2.2 2-Hydroxy-Benzophenones

For example, the 4-hydroxy-4-methoxy-,4-octoxy,4-decyloxy-, 4-dodecyloxy-,4-benzyloxy,4,2',4'-trihydroxy-and 2'-hydroxy-4,4'-dimethoxy derivative.

2.3 Esters of Substituted and Unsubstituted Benzoic Acids

For example, phenyl salicilate; 4-tertbutylphenyl-salicilate; octylphenyl salicylate; dibenzoylresorcinol; bis-(4-tert-butylbenzoyl)-resorcinol; benzoylresorcinol; 2,4-di-tert-butyl-phenyl-3,5-di-tert-butyl-4-hydroxybenzoate; and hexadecyl-3,5-di-tert-butyl-4-hydroxybenzoate.

2.4 Acrylates

For example, alpha-cyano-.beta,.beta.-diphenylacrylic acid-ethyl ester or isooctyl ester; alpha-carbomethoxy-cinnarnic acid methyl ester; alpha-cyano-.beta.-methyl-p-methoxy-cinnamic acid methyl ester or butyl ester; alpha-carbomethoxy-p-methoxy-cinnamic acid methyl ester; and N-(beta-carbomethoxy-beta-cyano-vinyl)-2-methyl-indoline.

2.5 Nickel Compounds

For example, nickel complexes of 2,2'-thio-bis(4-(1,1,1, 3-tetramethylbutyl)-phenol), such as the 1:1 or 1:2 complex, optionally with additional ligands such as n-butylamine, triethanolamine or N-cyclohexyl-diethanolamine; nickel dibutyldithiocarbamate; nickel salts of 4-hydroxy-3,5-di-tert-butylbenzylphosphonic acid monoalkyl esters, such as of the methyl; ethyl; or butyl ester; nickel complexes of ketoximes such as of 2-hydroxy-4-methyl-penyl undecyl ketoxime; and nickel complexes of 1-phenyl-4-lauroyl-5-hydroxy-pyrazole, optionally with additional ligands.

2.6 Sterically Hindered Amines

For example, bis(2,2,6,6-tetramethylpiperidyl)-sebacate; bis-5 (1,2,2,6,6-pentamethylpiperidyl)-sebacate; n-butyl-3, 5-di-tert-butyl-4-hydroxybenzyl malonic acid bis(1,2,2,6,6,-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-arbonic acid; and 1,1'(1,2-ethanediyl)-bis-(3,3,5,5-tetramethylpiperazinone). These amines typically called HALS (Hindered Amines Light Stabilizing) include butane tetracarboxylic acid 2,2,6,6-tetramethyl piperidinol esters. Such amines include hydroxylamines derived from hindered amines, such as di(1-hydroxy-2,2,6,6-tetramethylpiperidin-4-yl) sebacate; 1-hydroxy 2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperdine; and N-(1-hydroxy-2, 2,6,6-tetramethyl-piperidin-4-yl)-epsiloncaprolactam.

2.7 Oxalic Acid Diamides

For example, 4,4'-di-octyloxy-oxanilide; 2,2'-di-octyloxy-5',5'-ditert-butyloxanilide; 2,2'-di-dodecyloxy-5',5'ditert-butyl-oxanilide; 2-ethoxy-2'-ethyl-oxanilide; N,N'-bis (3-dimethylaminopropyl)-oxalamide; 2-ethoxy-5-tert-butyl-2'-ethyloxanilide and its mixture with 2-ethoxy-2'-ethyl-5,4-di-tert-butyloxanilide; and mixtures of ortho-and para-methoxy as well as of o- and p-ethoxy-disubstituted oxanilides.

2.8 Hydroxyphenyl-s-triazines

For example, 2,6-bis-(2,4-dimethylphenyl)-4-(2-hydroxy-4octyloxyphenyl)-s-triazine; 2,6-bis(2,4-dimethylphenyl)-4-(2,4-dihydroxyphenyl)-s-triazine; 2,4-bis(2,4-dihydroxyphenyl)-6-(4-chlorophenyl)-s-triazine; 2,4-bis(2-hydroxy-4-(2-hydroxyethoxy)phenyl)-6-(4-chlorophenyl)-s-triazine; 2,4-bis(2hydroxy-4-(2-hydroxyethoxy)phenyl)-6-phenyl-s-triazine; 2,4-bis(2-hydroxy-4-(2-hydroxyethoxy)-phenyl)-6-(2,4-dimethylphenyl)-s-tri azine; 2,4-bis(2-hydroxy-4-(2-hydroxyethoxy)phenyl)-6-(4-bromo-phenyl)-s-triazine; 2,4-bis(2-hydroxy-4-(2-acetory-ethoxy)phenyl)-6-(4-chlorophenyl)-s-triazine; and 2,4-bis (2,4-dihydroxyphenyl)-6-(2,4-dimethylphenyl)-1-s-triazine.

3. Metal Deactivators

For example, N,N'diphenyloxalic acid diamide; N-salicylal-N'-salicyloylhydrazine; N,N'-bis-salicyloylhydrazine; N,N'-bis-(3,5-di-tert-butyl-4-hydrophenylpropionyl)-2-hydrazine; salicyloylamino-1,2,4-triazole; and bis-benzylidenoxalic acid dihydrazide.

4. Phosphites and Phosphonites

For example, triphenyl phosphite; diphenylalkyl phosphates; phenyldialkyl phosphates; tris(nonyl-phenyl)phosphite; trilauryl phosphite; trioctadecyl phosphite; distearyl pentaerythritol diphosphite; tris(2,4-di-tert-butylphenyl) phosphite; diisodecyl pentaerythritol diphosphite; 2,4,6-tri-tert-butylphenyl-2-butyl-2-ethyl-1,3-propanediol phosphite; bis(2,4-di-tert-butylphenyl)pentaerythritol diphosphite tristearyl sorbitol triphosphite; and tetrakis(2,4-di-tert-butylphenyl)4,4'-biphenylene diphosphonite.

It is particularly preferred to include a diphosphite and diphosphonite as these additives may extend the "processing window" (i.e. allowing the part to remain in the mold for an extended period of time without becoming "overcooked" to the point of discoloration and/or the loss of physical properties).

5. Peroxide Scavengers

For example, esters of betathiodipropionic acid, for example the lauryl, stearyl, myristyl or tridecyl esters; mercaptobenzimidazole or the zinc salt of 2-mercaptobenzimidazole; zinc-dibutyldithiocarbamate; dioctadecyldisulfide; and pentaerythritottetrakis-(beta-dodecylmercapto)-propionate.

6. Hydroxylamines and Amine Oxides

For example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamine; N-heptadecyl-N-octadecylhydroxylamine; and N,N-dialkylhydroxylamine derived from hydrogenated tallow amine. The analogous amine oxides (as disclosed in U.S. Pat. No. 5,844,029, Prachu et al.) are also suitable.

7. Nitrones

For example, N-benzyl-alpha-phenyl nitrone; N-ethyl-alpha-methyl nitrone; N-octyl-alpha-heptyl nitrone; N-lauryl-alpha-undecyl nitrone; N-tetradecyl-alpha-tridecyl nitrone; N-hexadecyl-alpha-pentadecyl nitrone; N-octadecyl-alpha-heptadecylnitrone; N-hexadecyl-alpha-heptadecyl nitrone; N-octadecyl-alpha-pentadecyl nitrone; N-heptadecyl-alpha-heptadecyl nitrone; N-octadecyl-alpha-hexadecyl nitrone; and nitrone derived from N,N-dialkylhydroxylamine derived from hydrogenated tallow amine.

8. Polyamide Stabilizers

For example, copper salts in combination with iodides and/or phosphorus compounds and salts of divalent manganese.

9. Basic Co-Stabilizers

For example, melamine; polyvinylpyrrolidone; dicyandiamide; triallyl cyanurate; urea derivatives; hydrazine derivatives; amines; polyamides; polyurethanes; alkali metal salts and alkaline earth metal salts of higher fatty acids, for example, Ca stearate, calcium stearoyl lactate, calcium lactate, Zn stearate, Mg stearate, Na ricinoleate and K palmitate; antimony pyrocatecholate or zinc pyrocatecholate, including neutralizers such as hydrotalcites and synthetic hydrotalcites; and Li, Na, Mg, Ca, Al hydroxy carbonates.

10. Nucleating Agents

For example, 4-tert-butylbenzoic acid; adipic acid; diphenylacetic acid; sodium salt of methylene bis-2,4-dibutylphenyl; cyclic phosphate esters; sorbitol tris-benzaldehyde acetal; and sodium salt of bis(2,4-di-t-butylphenyl) phosphate or Na salt of ethylidene bis(2,4-di-t-butyl phenyl) phosphate. Nucleating agents may improve stiffness of the rotomolded part.

11. Fillers and Reinforcing Agents

For example, calcium carbonate; silicates; glass fibers; asbestos; talc; kaolin; mica; barium sulfate; metal oxides and hydroxides; carbon black and graphite.

12. Other Additives

For example, plasticizers; epoxidized vegetable oils, such as epoxidized soybean oils; lubricants; emulsifiers; pigments; optical brighteners; flameproofing agents; anti-static agents; blowing agents and thiosynergists, such as dilaurythiodipropionate or distearylthiodipropionate.

Foamable rotomolded parts are also contemplated. As disclosed in U.S. Pat. No. 5,532,282 (Needham) foaming agents are useful to reduce part weight, provide a higher insulation value, increase stiffness and reduce resin cost. Generally, foaming agents may be classified as "physical" or "chemical" foaming agents. Typically, physical foaming agents are normally gaseous at the temperature at which the plastic mass is to be foamed. Chemical foaming agents are typically compositions which decompose or react to form a gas. Heat decomposable, foaming agents include organic compounds such as azodicarbonamide, 4,4'-oxybisbenzenesulfonyl hydrazide, and p-toluenesulfonyl hydrazide; disadvantages include cost and unpleasant odor. Carbon dioxide-releasing, foaming agents include inorganic salts such as sodium, ammonium and potassium bicarbonate. A foaming coagent is advantageously used with a reactive type, chemical foaming agent, and for an acid-released foaming agent, a fatty acid such as stearic acid or a mild organic acid such as citric acid is often used as the coagent.

Useful co-additives, when foaming thermoplastics, include foam nucleating agents. A foam nucleating agent promotes uniform cell size and reduces the existence of surges and voids in the foam. Suitable foam nucleating agents include calcium carbonate; pigments such as carbon black; and silicates such as kaolins, talc, aluminum silicate, magnesium silicate and calcium silicate.

Similarly, crosslinkable rotomolded parts are contemplated. As disclosed in U.S. Pat. No. 5,367,025 (Needham) crosslinking agents may include a combination of organic peroxide initiator and a crosslinking co-agent. For rotomolding, dialkyl peroxides used include 2,5-dimethyl-2,5-di(t-butylperoxy)hexane or alpha,alpha'-bis(t-butylperoxy)diisopropylbenzene or those disclosed in U.S. Pat. No. 3,214,422. Co-agents used by those experienced in the art of crosslinking polyethylene, include triallyl cyanurate, triallyl isocyanurate, triallyl trimellitate, trimethololpropane trimethacrylate and related monomers.

EXAMPLE 1

A series of eight ethylene-octene resin "blends" were prepared using the dual reactor solution polymerization process and phosphinimine catalyst system which as generally disclosed in the examples of U.S. Pat. No. 6,372,864 (Brown et al.). The reactor conditions were adjusted so that the first reactor operated at a slightly lower temperature in comparison to the second reactor, resulting in the ethylene-octene polymer being produced in the first reactor having a higher molecular weight. The octene comonomer flow to the reactors was split in a manner such that the short chain branching content of the polymer produced in the second reactor was similar to, but slightly higher than the SCB of the copolymer produced in the first reactor. However, the absolute differences in SCB were small (and it is estimated that the density difference between the two blend components was less than 0.015 grams per cubic centimeter). The mass fraction of the polymer blend produced in the first reactor was about 30% (with the remaining part of the blend being produced in the second reactor). The "absolute" difference in the molecular weight of the blend components products in the two reactors was also small—as illustrated by the molecular weight distribution data (Mw/Mn) which are reported for the blends in Table 1 (i.e. the MWD of the blends ranges from 2.0 to 2.3).

An additive package consisting of about 100 parts per million (ppm) of a hindered phenol (sold under the trademark Irganox 1076 by Ciba Specialty) and about 325 ppm of a phosphite was added to blends 1–5 immediately after polymerization but not to blends 6–8.

The blends were subsequently compounded with antioxidants and stabilizers (such as additional phosphite, hydroxylamine, and hindered amine—as shown in Table 1) and ground into fine powder for using in the preparation of rotomolded parts.

Rotomolded parts were then prepared in a rotational molding machine sold under the tradename Rotospeed RS3-160 by Ferry Industries Inc. The machine has two arms which rotate about a central axis. Each arm is fitted with a plate which rotates on an axis that is roughly perpendicular to the axis of rotation of the arm. Each plate is fitted with three cast aluminum molds that produce plastic cubes having dimensions of 12.5 inches (31.8 cm)×12.5 inches×12.5 inches. These molds produce parts having a nominal thickness of about 0.25 inches (0.64 cm) when initially filled with a standard charge of about 3.7 kg of polyethylene resin.

A gas fired furnace which is capable of providing 2 million British thermal units (Btu) per hour is used to provide hot air that is circulated about the molds by a fan. This furnace consumes a great deal of energy. For example, at a gas cost of $5 per million Btu, the furnace uses $10 of gas per hour when operating at full capacity. One way to reduce energy costs is to reduce molding temperatures. As will be shown, the present process does facilitate the use of lower molding temperatures. The temperature within the enclosed oven is maintained at a temperature of between 520° F. (271° C.) and 600° F. (316° C.) for specified periods of time while the machine rotates the arms (typically, at about 8 revolutions per minute (rpm) and the plate (typically, at about 2 rpm).

The "cooked parts" are then cooled by opening the oven. Water spray may also be used to facilitate cooling. "Cook times", rotation speed, temperatures and cooling cycles are computer controlled with appropriate software which also includes a data acquisition system.

Physical properties of the polyethylene resins and the molded cubes were measured using the following standard test methods:

Melt Index ($I_2$) was measured according to ASTM D 1238 at 230° C. using a 2.16 kg load. Melt flow ratio (MFR) is the ratio of $I_{21}$ (i.e. melt index according to ASTM D 1238 at 230° C. using a 21.6 kg load) divided by $I_2$.

Modulus was measured according to ASTM D 638 using an Instron machine.

Environmental Stress Crack Resistance (ESCR) was measured using a test method which is generally based on ASTM D 5397 and ISO 6252 but has been adapted by the Association of Rotational Molders. This test method is used to evaluate the susceptibility of polyethylene materials to stress cracking undergoing a constant tensile load, in the influence of certain environmental conditions. Such conditions may be found in upright rotational molded storage tanks. The test method is based on a single point load level to avoid the need to establish the yield stress of materials which would involve additional testing equipment.

Instrumented Impact Testing ("Dynatap Testing") was measured according to ASTM D3762 using a Dynatap 8230 apparatus. This apparatus was also used to determine "brittle" versus "ductile" failures of the molded cubes.

Yellowness Index (YI) was determined according to ASTM D 1925.

Rotomolded cubes were then prepared using the above described machine at an oven temperature of 520° F. for each of the 8 resins and a comparative state of the art rotomolding resin. The comparative resin is an ethylene-hexene copolymer produced with a Ziegler Natta catalyst in a gas phase process. The melt index of the comparative resin is 1.97 g/10 minutes and the density is 0.941 grams/cubic centimeter (g/cc). The comparative resin contains more than 15 weight % of "high density homopolymer" (which is typically of resins prepared with Ziegler Natta catalysts) and has a higher melting point in comparison to the resins used according to this invention. A total of nine different molding times were used for each of the 8 resins and one comparative resin (i.e. a total of 81 "cubes" were molded at 520° F.).

The density of the "as molded" part for each time and temperature condition is shown in Table 2A. These data may be used to monitor the extent of "cooking"—i.e. the density increases (to a maximum) as the plastic powder melts and sinters into a homogeneous part. That is, the density of the "partially cooked" parts is generally lower than the density of the resin being used to prepare the part (probably because the "partially cooked" parts have not been "cooked enough" to allow the plastic to flow into the mold, melt and sinter to a uniform consistency). As the parts become more fully cooked, the part density increases until it approaches the density of the resin used to mold the part.

The excellent impact strength data and ductility of the rotomolded parts according to this invention data are shown in Table 2B and 2C respectively.

Yellowness index values are reported in Table 2D.

Molding operations were then repeated at 600° F. and data are reported in Tables 3A to 3D.

It will be apparent from the data that the rotomolded parts prepared with blends 1 to 8 have excellent (fast) cycle times in comparison to the part prepared from comparative resin C1. Moreover, none of these parts were severely warped. While not wishing to be bound by theory, it is believed that the resin blends of this invention may be cooled more quickly without warping in comparison to a part made from a single homogeneous resin. Also for comparison, the ESCR of two rotomolding resins sold by Borealis under the tradenames ME 8160 and ME 8166 were tested. These resins have homogeneous comonomer distribution and are believed to be manufactured with a metallocene catalyst. ESCR values of 29.3 hours and 59.8 hours (respectively) were observed for these resins.

TABLE 2B

Impact Strength (Dynatup Impact Energy at −40° C., ft-lb)

Oven Time (minutes)

| Blend | 10 | 12.5 | 15 | 17.5 | 20 | 22.5 | 25 | 27.5 | 30 |
|---|---|---|---|---|---|---|---|---|---|
| 1 | 11.5 | 22.1 | 47.8 | 73.9 | 74.3 | 81.7 | 84.1 | 81.7 | 86.2 |
| 2 | 15.8 | 29 | 50.6 | 70.1 | 77.4 | 85.4 | 82.4 | 84.2 | 66.7 |
| 3 | 13.3 | 31.6 | 44.4 | 67.6 | 72 | 84.7 | 85.5 | 85.2 | 50.8 |
| 4 | 6 | 17.8 | 34.7 | 68.7 | 73.6 | 86.4 | 84.5 | 84.5 | 84.7 |
| 5 | 12.2 | 27.4 | 49.6 | 71.5 | 78.6 | 84.4 | 82.6 | 81.1 | 80.5 |
| 6 | 16.2 | 33.2 | 35.1 | 74.3 | 73.8 | 83.8 | 87.7 | 85.6 | 91.4 |
| 7 | 15.6 | 35.2 | 64.4 | 66.6 | 75.7 | 79.8 | 79.9 | 86.7 | 82.7 |
| 8 | 16 | 38.5 | 66.1 | 65.8 | 76.1 | 80 | 81 | 80.7 | 82.2 |
| C1 | 5.7 | 10.5 | 47.3 | 64 | 60.5 | 64.2 | 71.4 | 80 | 80.8 |

TABLE 1

|  | 1 | 2 | 3 | 4 | 5 | 6 | 7 | 8 | C1 |
|---|---|---|---|---|---|---|---|---|---|
| $I_2$ (g/10 min) | 1.64 | 4.60 | 1.51 | 1.78 | 1.87 | 1.61 | 1.54 | 1.52 | 1.97 |
| $I_{21}/I_2$ | 22.1 | 21.9 | 22.5 | 21.6 | 21.1 | 21.4 | 21.2 | 20.9 | 23.5 |
| Mn × $10^{-3}$ | 36.1 | 41 | 40.7 | 39.9 | 36.8 | 41.3 | 40.6 | 42 | 23.9 |
| Mw × $10^{-3}$ | 82.1 | 84.5 | 85.1 | 83.4 | 80.3 | 84.1 | 83.3 | 84 |  |
| Mz × $10^{-3}$ | 154.5 | 160.6 | 183.4 | 194.1 | 151.8 | 147.1 | 146 | 146.4 |  |
| MWD | 2.3 | 2.1 | 2.1 | 2.1 | 2.2 | 2.0 | 2.1 | 2.0 |  |
| ESCR (hours) | 65.1 | 77.9 | 86.8 | 66.7 | 58.2 | 72.8 | 71.5 | 76.3 | 204.3 |
| Secant Modulus, 1% (MPa) | 875 | 817 | 780 | 782 | 783 | 804 | 802 | 813 | 820 |
| A/O Package: |  |  |  |  |  |  |  |  |  |
| AO1[a] (ppm) | 92 | 95 | 100 | 87 | 94 |  |  |  |  |
| P1[b] (ppm) | 574 | 546 | 553 | 512 | 619 | 241 | 494 | 290 |  |
| Zn-Stearate (ppm) | 313 | 332 | 317 | 329 | 462 | 355 | 716 | 457 |  |
| HA[c] (ppm) | 500 | 500 | 500 | 500 | 500 | 500 | 500 | 500 |  |
| P2[d] (ppm) | 2943 | 2871 | 2906 | 2986 | 3854 | 3323 | 6535 | 4297 |  |
| HALS[e] (ppm) | 484 | 591 | 559 | 545 | 655 | 611 | 1203 | 721 |  |
| Density (g/cm³) | 0.9412 | 0.9411 | 0.9402 | 0.9404 | 0.9414 | 0.9412 | 0.9407 | 0.9407 |  |

[a] AO1 = hindered phenol sold under the trademark Irganox 1076 by Ciba Specialties
[b] P1 = phosphite sold under the trademark Irgaphos 168 by Ciba Specialties
[c] HA = hydroxyl amine sold under trademark Irgastab FS042 by Ciba Specialties
[d] P2 = diphosphite sold under the trademark Dovephos S9228 by Dover Chemicals
[e] HALS = hindered amine sold under the trademark Cyasorb 3346 by Cytec Industries
Mn = number average molecular weight
Mw = weight average molecular weight
MWD = molecular weight distribution, Mw/Mn

TABLE 2A

Part Density as Molded (g/cc)

Oven Time (minutes)

| Blend | 10 | 12.5 | 15 | 17.5 | 20 | 22.5 | 25 | 27.5 | 30 |
|---|---|---|---|---|---|---|---|---|---|
| 1 |  |  | 0.9237 | 0.9333 | 0.9382 | 0.9449 | 0.9450 | 0.9451 | 0.9450 |
| 2 |  |  | 0.9244 | 0.9308 | 0.9412 | 0.9440 | 0.9443 | 0.9433 | 0.9443 |
| 3 |  |  | 0.9180 | 0.9249 | 0.9343 | 0.9433 | 0.9435 | 0.9436 | 0.9435 |
| 4 |  |  | 0.9206 | 0.9268 | 0.9358 | 0.9440 | 0.9445 | 0.9438 | 0.9442 |
| 5 |  |  | 0.9283 | 0.9347 | 0.9429 | 0.9440 | 0.9439 | 0.9438 | 0.9442 |
| 6 |  |  | 0.9302 | 0.9363 | 0.9420 | 0.9452 | 0.9450 | 0.9444 | 0.9451 |
| 7 |  |  | 0.9265 | 0.9347 | 0.9401 | 0.9436 | 0.9443 | 0.9440 | 0.9439 |
| 8 |  |  | 0.9269 | 0.9350 | 0.9427 | 0.9442 | 0.9445 | 0.9446 | 0.9444 |
| C1 |  |  | 0.9176 | 0.9169 | 0.9167 | 0.9236 | 0.9344 | 0.9418 | 0.9424 |

TABLE 2C

% Ductility at −40° C. (%)

Oven Time (minutes)

| Blend | 10 | 12.5 | 15 | 17.5 | 20 | 22.5 | 25 | 27.5 | 30 |
|---|---|---|---|---|---|---|---|---|---|
| 1 | 0 | 0 | 0 | 100 | 100 | 100 | 100 | 100 | 100 |
| 2 | 0 | 0 | 25 | 100 | 100 | 100 | 100 | 100 | 75 |
| 3 | 0 | 100 | 25 | 100 | 100 | 100 | 100 | 100 | 25 |
| 4 | 0 | 0 | 0 | 100 | 100 | 100 | 100 | 100 | 100 |
| 5 | 0 | 0 | 50 | 100 | 100 | 100 | 100 | 100 | 100 |
| 6 | 0 | 0 | 25 | 100 | 100 | 100 | 100 | 100 | 100 |
| 7 | 0 | 0 | 100 | 100 | 100 | 100 | 100 | 100 | 100 |
| 8 | 0 | 0 | 100 | 100 | 100 | 100 | 100 | 100 | 100 |
| C1 | 0 | 0 | 0 | 100 | 100 | 100 | 100 | 100 | 100 |

TABLE 2D

Colour (Yellowness Index Measured on Inside of Part)

Oven Time (minutes)

| Blend | 10 | 12.5 | 15 | 17.5 | 20 | 22.5 | 25 | 27.5 | 30 |
|---|---|---|---|---|---|---|---|---|---|
| 1 | | −11.9 | −12.8 | −13 | −12.5 | −11.3 | −10.2 | 5.92 | |
| 2 | | −12.5 | −13.6 | −13.7 | −13.7 | −12.5 | −10.6 | −1.12 | |
| 3 | | −11.9 | −13.3 | −13.6 | −13.5 | −12.7 | −9.03 | 6.51 | |
| 4 | | −12.2 | −12.6 | −13.2 | −12.6 | −11.2 | −9.94 | −3.03 | |
| 5 | | −12.5 | −13.1 | −13 | −12.3 | −10.7 | −10.7 | 0.16 | |
| 6 | | −12 | −12.6 | −12.9 | −10.7 | −11.1 | −8.43 | 9.98 | |
| 7 | | −12.2 | −13.3 | −13.4 | −11.83 | −11.1 | −9.47 | 9.82 | |
| 8 | | −12.2 | −13.7 | −12.9 | −10.8 | −9.26 | −4.72 | 11.9 | |
| C1 | | −8.39 | −8.74 | −8.21 | −6.89 | −5.13 | 2.53 | 10.71 | |

Table 3-600° F.

TABLE 3A

Part Density as Molded (g/cc)

Oven Time (minutes)

| Blend | 10 | 12.5 | 15 | 17.5 | 20 | 22.5 |
|---|---|---|---|---|---|---|
| 1 | | 0.926 | 0.9358 | 0.9442 | 0.9446 | 0.9452 |
| 2 | | 0.9238 | 0.9396 | 0.9437 | 0.9438 | 0.9444 |
| 3 | | 0.9191 | 0.9304 | 0.9414 | 0.9424 | 0.9438 |
| 4 | | 0.9181 | 0.9304 | 0.9426 | 0.9439 | 0.944 |
| 5 | | 0.9279 | 0.9398 | 0.9434 | 0.9444 | 0.9445 |
| 6 | 0.9200 | 0.9254 | 0.9404 | 0.9451 | 0.9449 | 0.9447 |
| 7 | | 0.9289 | 0.9425 | 0.9445 | 0.9445 | 0.9442 |
| 8 | | 0.9253 | 0.9375 | 0.9436 | 0.9431 | 0.9442 |
| C1 | | 0.9169 | 0.9189 | 0.931 | 0.9421 | 0.9426 |

TABLE 3B

Impact Strength (Dynatup Impact Energy at −40° C., ft-lb)

Oven Time (minutes)

| Blend | 10 | 12.5 | 15 | 17.5 | 20 | 22.5 |
|---|---|---|---|---|---|---|
| 1 | 32.9 | 67.3 | 73.7 | 79.7 | 79.1 | 78.6 |
| 2 | 37.6 | 64.2 | 73.1 | 85.1 | 80.9 | 78.5 |
| 3 | 22 | 63 | 67.8 | 80.2 | 82.8 | 83.3 |
| 4 | 28 | 57.3 | 73.2 | 80.9 | 87.3 | 83.4 |
| 5 | 24.4 | 66.2 | 77.4 | 81.4 | 83.2 | 69.8 |
| 6 | 45.4 | 70.1 | 78.2 | 84.6 | 85.5 | 84.6 |
| 7 | 43.3 | 70.9 | 72.4 | 81.6 | 80 | 80.8 |
| 8 | 30.9 | 65.6 | 70.8 | 80.5 | 78.2 | 77.5 |
| C1 | 10.9 | 63.9 | 56.1 | 64.3 | 78.1 | 82.5 |

TABLE 3C

% Ductility at −40° C. (%)

Oven Time (minutes)

| Blend | 10 | 12.5 | 15 | 17.5 | 20 | 22.5 |
|---|---|---|---|---|---|---|
| 1 | 0 | 100 | 100 | 100 | 100 | 100 |
| 2 | 0 | 100 | 100 | 100 | 100 | 100 |
| 3 | 0 | 100 | 100 | 100 | 100 | 100 |
| 4 | 0 | 50 | 100 | 100 | 100 | 100 |
| 5 | 0 | 100 | 100 | 100 | 100 | 75 |
| 6 | 0 | 100 | 100 | 100 | 100 | 100 |
| 7 | 0 | 100 | 100 | 100 | 100 | 100 |
| 8 | 100 | 100 | 100 | 100 | 100 | 100 |
| C1 | 0 | 100 | 0 | 100 | 100 | 100 |

TABLE 2D

Colour (Yellowness Index Measured on Inside of Part)

Oven Time (minutes)

| Blend | 10 | 12.5 | 15 | 17.5 | 20 | 22.5 |
|---|---|---|---|---|---|---|
| 1 | | −11.9 | −12.3 | −11.2 | −8.94 | 17.1 |
| 2 | | −13.08 | −13 | −12.6 | −8.86 | 19.1 |
| 3 | | −12.42 | −12.6 | −13.3 | −7.32 | 16.4 |
| 4 | | −12.4 | −13.4 | −12.9 | −12.4 | 9.08 |
| 5 | | −12.1 | −12.2 | −9.28 | −8.77 | 14.5 |
| 6 | −11.7 | −12.4 | −13.4 | −13.4 | −6.43 | 19.6 |
| 7 | | −12 | −12.4 | −10.7 | −8.46 | 21.8 |
| 8 | | −12.1 | −12.1 | −11.7 | −0.51 | 20.1 |
| C1 | | −8.69 | −7.75 | −5.69 | 1.9 | 16.03 |

EXAMPLE 2

Another series of resin blends was prepared using the dual reactor polymerization process and catalyst system as generally described in U.S. Pat. No. 6,372,864 (Brown et al.). These blends (labeled blends 9–14 in Table 4) generally had a lower molecular weight (higher $I_2$) and/or a slightly broader molecular weight distribution (MWD) than the blends of Example 1.

The blends were molded at 520° F. and 600° F. using the procedures as generally described in Example 1. Properties of the resulting rotomolded parts are shown in Tables 5 and 6.

Once again, the fast cycle time of the inventive process is evident. The molded parts exhibit excellent physical properties and none of the inventive parts was severely warped.

EXAMPLE 3

A third series of resin blends was prepared using the polymerization process and catalyst systems as generally disclosed in U.S. Pat. No. 6,372,864 (Brown et al.) (see Table 7, blends 17–25). However, in comparison to the blends of Examples 1 and 2, the blends of this example were prepared using a higher octene concentration in the first reactor (while continuing to operate the first reactor at a colder temperature). Thus, the blend component produced in the first reactor had a higher molecular weight and a lower density in comparison to the blend component produced in the second reactor. However, once again, the "absolute" differences in molecular weight were small (as indicated in the molecular weight distribution data) as were the absolute differences in density (once again, the differences was estimated at less than 0.015 g/cc). The mass fraction of the polymer produced in the first reactor was about 30% of the total. The ESCR of the parts prepared from the blends of this example is substantially increased in comparison to those of Example 1.

The blends were molded at 520° F. and 600° F. using the procedures as generally described in Example 1. Properties of the resulting rotomolded parts are shown in Tables 8 and 9.

Once again, the fast cycle time of the inventive process is evident. The molded parts exhibit excellent physical properties and none of the inventive parts was severely warped.

TABLE 4

|  | 9 | 10 | 11 | 12 | 13 | 14 |
|---|---|---|---|---|---|---|
| $I_2$ (g/10 min) | 5.15 | 4.67 | 5.01 | 5.59 | 4.81 | 5.61 |
| $I_{21}/I_2$ | 20.4 | 20.8 | 23.1 | 21.1 | 20.9 | 23.1 |
| Mn × $10^{-3}$ | 28.1 | 29.1 | 27.9 | 27.5 | 30.2 | 27.8 |
| Mw × $10^{-3}$ | 64.8 | 64.7 | 64.7 | 62.6 | 64.3 | 63.4 |
| Mz × $10^{-3}$ | 126 | 121.1 | 134.3 | 128.7 | 122.4 | 136.7 |
| MWD | 2.3 | 2.2 | 2.3 | 2.3 | 2.1 | 2.3 |
| ESCR (hours) | 32.2 | 36.3 | 30.1 | 37.2 | 49.3 | 33.2 |
| Flex Secant Modulus, 1% (MPa) | 686 | 665 | 674 | 598 | 663 | 689 |
| A/O Package: |  |  |  |  |  |  |
| AO1[a] (ppm) |  |  |  |  |  |  |
| P1[b] (ppm) | 287 | 244 | 550 | 564 | 543 | 549 |
| Zn-Stearate (ppm) | 410 | 368 | 322 | 330 | 330 | 332 |
| HA[c] (ppm) | 500 | 500 | 500 | 500 | 500 | 500 |
| P2[d] (ppm) | 4121 | 3827 | 2893 | 2890 | 2827 | 2914 |
| HALS[e] (ppm) | 512 | 552 | 620 | 607 | 513 | 611 |
| Density (g/cm³) | 0.9381 | 0.9376 | 0.9390 | 0.9342 | 0.9348 | 0.9357 |

[a] AO1 = hindered phenol sold under the trademark Irganox 1076 by Ciba Specialties
[b] P1 = phosphite sold under the trademark Irgaphos 168 by Ciba Specialties
[c] HA = hydroxyl amine sold under trademark Irgastab FS042 by Ciba Specialties
[d] P2 = diphosphite sold under the trademark Dovephos S9228 by Dover Chemicals
[e] HALS = hindered amine sold under the trademark Cyasorb 3346 by Cytec Industries
Mn = number average molecular weight
Mw = weight average molecular weight
MWD = molecular weight distribution, Mw/Mn Table 5-520° F.

TABLE 5A

Part Density as Molded (g/cc)

Oven Time (minutes)

| Blend | 10 | 12.5 | 15 | 17.5 | 20 | 22.5 | 25 | 27.5 | 30 |
|---|---|---|---|---|---|---|---|---|---|
| 9  | 0.937  | 0.9395 | 0.9409 | 0.94   | 0.9408 | 0.9397 | 0.9438 | 0.941 |
| 10 | 0.9247 | 0.9398 | 0.9402 | 0.9404 | 0.9396 | 0.9402 | 0.9403 | 0.9405 |
| 11 | 0.9389 | 0.9401 | 0.9416 | 0.9415 | 0.9405 | 0.9415 | 0.9405 | 0.9411 |
| 12 | 0.9321 | 0.9359 | 0.9364 | 0.9371 | 0.937  | 0.9367 | 0.9369 | 0.9362 |
| 13 | 0.9313 | 0.9354 | 0.9361 | 0.9366 | 0.9363 | 0.9364 | 0.9361 | 0.9367 |
| 14 | 0.9319 | 0.9384 | 0.9377 | 0.938  | 0.9381 | 0.9379 | 0.9378 | 0.9383 |
| C2 | 0.9187 | 0.9187 | 0.9193 | 0.9249 | 0.9362 | 0.9386 | 0.9386 | 0.9378 |
| C3 | 0.9208 | 0.9209 | 0.9226 | 0.9281 | 0.9347 | 0.9346 | 0.9358 | 0.9358 |
| C4 | 0.9216 | 0.9259 | 0.9273 | 0.9355 | 0.9363 | 0.9358 | 0.9369 | 0.9362 |

TABLE 5B

Impact Strength (Dynatup Impact Energy at −40° C., ft-lb)

Oven Time (minutes)

| Blend | 10 | 12.5 | 15 | 17.5 | 20 | 22.5 | 25 | 27.5 | 30 |
|---|---|---|---|---|---|---|---|---|---|
| 9  | 6.6 | 65.1 | 75.5 | 79   | 78.5 | 77.4 | 76.5 | 81.4 | 74.7 |
| 10 | 5.9 | 66.2 | 74.6 | 80   | 79.6 | 76.7 | 76.6 | 76.4 | 76 |
| 11 | 4.8 | 66.5 | 69.2 | 81.4 | 81.7 | 80.4 | 79.4 | 10.9 | 74.9 |
| 12 | 7.7 | 60   | 69.2 | 78.1 | 76.3 | 74.9 | 75.1 | 10.4 | 63.5 |
| 13 | 5.7 | 63.1 | 69.3 | 78.8 | 74.3 | 78.8 | 74.7 | 42.6 | 73.6 |
| 14 | 4.8 | 64   | 80.9 | 79   | 78   | 78.2 | 77   | 45.7 | 44.6 |
| C2 | 7.7 | 35.1 | 39.7 | 37.6 | 45.9 | 62.7 | 81.2 | 78.3 | 78.1 |
| C3 | 7.9 | 56   | 47.3 | 59   | 60.7 | 75.8 | 76.5 | 76   | 74.3 |
| C4 | 8.7 | 27   | 34   | 32.7 | 30.4 | 13.3 | 70.7 | 7.8  | 8.9 |

TABLE 5C

% Ductility at −40° C. (%)

Oven Time (minutes)

| Blend | 10 | 12.5 | 15 | 17.5 | 20 | 22.5 | 25 | 27.5 | 30 |
|---|---|---|---|---|---|---|---|---|---|
| 9  | 100 | 100 | 100 | 100 | 100 | 100 | 100 | 100 |
| 10 | 100 | 100 | 100 | 100 | 100 | 100 | 100 | 100 |
| 11 | 100 | 100 | 100 | 100 | 100 | 100 | 0   | 100 |
| 12 | 100 | 100 | 100 | 100 | 100 | 100 | 0   | 100 |
| 13 | 100 | 100 | 100 | 100 | 100 | 100 | 50  | 100 |
| 14 | 100 | 100 |     | 100 | 100 | 100 | 50  | 50 |
| C2 | 0   | 0   | 0   | 50  | 100 | 100 | 100 | 100 |
| C3 | 0   | 25  | 100 | 100 | 100 | 100 | 100 | 100 |
| C4 | 0   | 0   | 0   | 0   | 0   | 100 | 0   | 0 |

TABLE 5D

Colour (Yellowness Index Measured on Inside of Part)

Oven Time (minutes)

| Blend | 10 | 12.5 | 15 | 17.5 | 20 | 22.5 | 25 | 27.5 | 30 |
|---|---|---|---|---|---|---|---|---|---|
| 9  | −16.4  | −17.1  | −16.6  | −15.1  | −13.3  | −10.6  | −6.01  | 1.29 |
| 10 | −17    | −17.6  | −16.7  | −15    | −13.1  | −11.9  | −3.13  | 8.64 |
| 11 | −16.3  | −17.1  | −16.8  | −15.3  | −14.4  | −12.3  | −1.7   | 8.55 |
| 12 | −17.6  | −17.7  | −17.54 | −15.7  | −14.6  | −13.4  | −2.17  | 8.2 |
| 13 | −17.75 | −18.01 | −16.35 | −15.65 | −14.07 | −12.95 | −9     | 6.48 |
| 14 | −17.07 | −17.9  | −17.28 | −16.3  | −14.35 | −13.18 | −12.22 | 9.96 |
| C2 | −9.93  | −10.9  | −9.74  | −10.05 | −8.78  | −2.92  | −6.19  | 6.85 |
| C3 | −12.21 | −13    | −12.29 | −12.19 | −10.64 | −4.51  | 3.85   | 14.27 |
| C4 | −12.47 | −13.57 | −12.15 | −14.99 | −12.78 | −9.57  | −1.14  | 13.4 |

Table 6-600° F.

TABLE 6A

Part Density as Molded (g/cc)

Oven Time (minutes)

| Blend | 10 | 12.5 | 15 | 17.5 | 20 | 22.5 |
|---|---|---|---|---|---|---|
| 9 | 0.9351 | 0.9413 | 0.9406 | 0.9408 | 0.9405 | 0.9402 |
| 10 | 0.9350 | 0.9401 | 0.9405 | 0.9400 | 0.9402 | 0.9405 |
| 11 | 0.9336 | 0.9397 | 0.9409 | 0.9371 | 0.9403 | 0.9409 |
| 12 | 0.9295 | 0.9363 | 0.9358 | 0.9415 | 0.9368 | 0.9368 |
| 13 | 0.9278 | 0.9361 | 0.9365 | 0.9364 | 0.9366 | 0.9367 |
| 14 | 0.932 | 0.9381 | 0.9381 | 0.938 | 0.9384 | 0.9381 |
| C2 |  | 0.9171 | 0.9268 | 0.9387 | 0.9389 | 0.9391 |
| C3 | 0.9195 | 0.9207 | 0.9298 | 0.9359 | 0.9359 | 0.9360 |
| C4 | 0.9230 | 0.9247 | 0.9354 | 0.9357 | 0.9362 | 0.9362 |

TABLE 6B

Impact Strength (Dynatup Impact Energy at −40° C., ft-lb)

Oven Time (minutes)

| Blend | 10 | 12.5 | 15 | 17.5 | 20 | 22.5 |
|---|---|---|---|---|---|---|
| 9 | 61.3 | 81.2 | 82.6 | 78.5 | 78.2 | 70.5 |
| 10 | 44.3 | 84.5 | 75.8 | 82 | 78.1 | 81.9 |
| 11 | 46.5 | 75 | 81.7 | 76.2 | 44.2 | 76.7 |
| 12 | 61.2 | 69.9 | 76.4 | 76.1 | 13.6 | 42.9 |
| 13 | 62.2 | 70.7 | 79.2 | 77.3 | 9.3 | 71 |
| 14 | 66.6 | 75.2 | 76.5 | 78.2 | 9.8 | 74.2 |
| C2 | 24.9 | 48.4 | 58.6 | 70.1 | 78.3 | 78.2 |
| C3 | 42.2 | 38.5 | 54.5 | 73.7 | 76.5 | 74.7 |
| C4 | 36.1 | 30.2 | 20.1 | 38.2 | 8.9 | 67.6 |

TABLE 6C

% Ductility at −40° C. (%)

Oven Time (minutes)

| Blend | 10 | 12.5 | 15 | 17.5 | 20 | 22.5 |
|---|---|---|---|---|---|---|
| 9 | 100 | 100 | 100 | 100 | 100 | 0 |
| 10 | 50 | 100 | 100 | 100 | 100 | 100 |
| 11 | 50 | 100 | 100 | 100 | 50 | 100 |
| 12 | 100 | 100 | 100 | 100 | 0 | 50 |
| 13 | 100 | 100 | 100 | 100 | 0 | 100 |
| 14 | 100 | 100 | 100 | 100 | 0 | 100 |
| C2 | 0 | 50 | 100 | 100 | 100 | 100 |
| C3 | 50 | 0 | 50 | 100 | 100 | 100 |
| C4 | 0 | 0 | 0 | 50 | 0 | 100 |

TABLE 6D

Colour (Yellowness Index Measured on Inside of Part)

Oven Time (minutes)

| Blend | 10 | 12.5 | 15 | 17.5 | 20 | 22.5 |
|---|---|---|---|---|---|---|
| 9 | −16.31 | −16.8 | −15.8 | −12.8 | −2.72 | 28 |
| 10 | −16.1 | −17 | −15.3 | −12.9 | −10.7 | 24.8 |
| 11 | −15 | −16.8 | −15.6 | −14.5 | −11.4 | 22.5 |
| 12 | −16.1 | −17.5 | −16 | −14.3 | −7.21 | 23.7 |
| 13 | −16.23 | −16.98 | −14.65 | −12.35 | −6.4 | 29.09 |
| 14 | −16.7 | −17.49 | −15.22 | −13.01 | −1.28 | 24.38 |
| C2 |  | −9.79 | −9.02 | −5.9 | 7.64 | 33.36 |
| C3 | −11.58 | −12.19 | −12.02 | −6.54 | 3.4 | 18.64 |
| C4 | −12.94 | −13.24 | −13.95 | −9.82 | 5.3 | 27.3 |

TABLE 7

|  | 17 | 18 | 19 | 20 | 21 | 22 | 23 | 24 | 25 |
|---|---|---|---|---|---|---|---|---|---|
| $I_2$ (g/10 min) | 1.82 | 1.60 | 1.44 | 1.50 | 2.07 | 1.15 | 1.62 | 1.57 | 1.56 |
| $I_{21}/I_2$ | 24 | 24 | 22.8 | 23.6 | 23 | 22.6 | 25.8 | 22.9 | 21.9 |
| Mn × $10^{-3}$ | 35.4 | 36.2 | 43 | 39.3 | 36.3 | 47.6 | 42.9 | 41.8 | 43.8 |
| Mw × $10^{-3}$ | 85.2 | 92.8 | 93.8 | 92.1 | 83.5 | 98 | 91.3 | 91.8 | 90.3 |
| Mz × $10^{-3}$ | 171.4 | 205 | 186.9 | 181.3 | 164.6 | 189 | 191.1 | 181.9 | 171.6 |
| MWD | 2.41 | 2.56 | 2.18 | 2.34 | 2.3 | 2.06 | 2.13 | 2.2 | 2.06 |
| ESCR (hours) | 201.5 | 240.3 | 406.8 | 572.6 | 342.4 | 509.8 | 271.5 | 245.3 | 320.5 |
| Flex Secant Modulus, 1% (MPA) | 956 | 923 | 864 | 851 | 874 | 861 | 933 | 869 | 886 |
| A/O Package: |  |  |  |  |  |  |  |  |  |
| AO1[a] (ppm) | 243 | 245 | 254 | 239 | 237 | 243 | 271 | 233 | 20 |
| P1[b] (ppm) | 686 | 681 | 707 | 683 | 697 | 689 | 697 | 682 | 580 |
| Zn-Stearate (ppm) | 339 | 331 | 336 | 329 | 318 | 334 | 335 | 328 | 317 |
| HA[c] (ppm) |  |  |  |  |  |  |  |  |  |
| P2[d] (ppm) | 2552 | 2692 | 2784 | 2595 | 2803 | 2745 | 3023 | 2713 | 2645 |
| HALS[e] (ppm) | 566 | 370 | 568 | 539 | 572 | 424 | 587 | 529 | 536 |
| Density (g/cm³) | 0.9439 | 0.9437 | 0.9414 | 0.9404 | 0.9402 | 0.9417 | 0.9434 | 0.941 | 0.9422 |

[a] AO1 = hindered phenol sold under the trademark Irganox 1076 by Ciba Specialties
[b] P1 = phosphite sold under the trademark Irgaphos 168 by Ciba Specialties
[c] HA= hydroxyl amine sold under trademark Irgastab FS042 by Ciba Specialties
[d] P2= diphosphite sold under the trademark Dovephos S9228 by Dover Chemicals
[e] HALS = hindered amine sold under the trademark Cyasorb 3346 by Cytec Industries
Mn = number average molecular weight
Mw = weight average molecular weight
MWD = molecular weight distribution, Mw/Mn Table 8-520° F.

TABLE 8A

Part Density as Molded (g/cc)

| Blend | 10 | 12.5 | 15 | 17.5 | 20 | 22.5 | 25 | 27.5 | 30 |
|---|---|---|---|---|---|---|---|---|---|
| 17 | | | 0.9309 | 0.9389 | 0.9464 | 0.9475 | 0.9474 | 0.9472 | 0.9473 |
| 18 | | | 0.9281 | 0.9343 | 0.943 | 0.9476 | 0.9475 | 0.9476 | 0.9474 |
| 19 | | | 0.9249 | 0.9306 | 0.9402 | 0.9442 | 0.9447 | 0.945 | 0.9447 |
| 20 | | | 0.9231 | 0.9284 | 0.9358 | 0.9426 | 0.9447 | 0.9444 | 0.9442 |
| 22 | | | | 0.9238 | 0.9314 | 0.939 | 0.9444 | 0.9448 | 0.9445 |
| 23 | | | 0.9256 | 0.9322 | 0.94 | 0.9464 | 0.9475 | 0.9473 | 0.9468 |
| 24 | | | 0.9264 | 0.93 | 0.9438 | 0.9446 | 0.9446 | 0.9446 | 0.9448 |
| 25 | | | 0.9246 | 0.93 | 0.9447 | 0.9446 | 0.9452 | 0.9454 | 0.945 |
| C1 | | | 0.9192 | 0.9176 | 0.9201 | 0.9277 | 0.9452 | 0.9424 | 0.9426 |

TABLE 8B

Impact Strength (Dynatup Impact Energy at −40° C., ft-lb)

| Blend | 10 | 12.5 | 15 | 17.5 | 20 | 22.5 | 25 | 27.5 | 30 |
|---|---|---|---|---|---|---|---|---|---|
| 17 | | | 67.5 | 70 | 77.1 | 87.3 | 83.4 | 83.6 | 84.8 |
| 18 | | | 63.4 | 71.2 | 76.2 | 84.8 | 78.7 | 87.6 | 87.4 |
| 19 | | | 64 | 66.2 | 71.5 | 78 | 79.2 | 82.7 | 81.8 |
| 20 | | | 44.5 | 67 | 69.1 | 75.5 | 80.9 | 76.5 | 80.2 |
| 22 | | | | 62.5 | 68.7 | 73.2 | 76 | 80.9 | 76 |
| 23 | | | 51.4 | 62 | 68.9 | 74.7 | 76.9 | 81.3 | 77.3 |
| 24 | | | 64.1 | 66.4 | 80.7 | 79.2 | 87.8 | 78.2 | 84.3 |
| 25 | | | 62.6 | 65.1 | 80.1 | 75.8 | 87.2 | 78.9 | 84.6 |
| C1 | | | 26.4 | 47.9 | 52.9 | 54.4 | 74.7 | 74.7 | 84.4 |

TABLE 8C

Stiffness (1% Flexural Secant Modulus, MPa)

| Blend | 10 | 12.5 | 15 | 17.5 | 20 | 22.5 | 25 | 27.5 | 30 |
|---|---|---|---|---|---|---|---|---|---|
| 17 | | | 870 | 942 | 954 | 963 | 980 | 930 | 935 |
| 18 | | | 722 | 879 | 910 | 945 | 999 | 911 | 928 |
| 19 | | | 760 | 865 | 822 | 908 | 821 | 927 | 863 |
| 20 | | | 652 | 787 | 821 | 870 | 829 | 866 | 823 |
| 22 | | | 872 | 808 | 829 | 867 | 875 | 865 | 858 |
| 23 | | | 716 | 830 | 869 | 922 | 914 | 934 | 902 |
| 24 | | | 693 | 757 | 834 | 851 | 840 | 870 | 896 |
| 25 | | | 696 | 790 | 894 | 816 | 900 | 864 | 851 |
| C1 | | | 731 | 766 | 776 | 802 | 809 | 774 | 791 |

TABLE 8D

Colour (Yellowness Index Measured on Inside of Part)

| Blend | 10 | 12.5 | 15 | 17.5 | 20 | 22.5 | 25 | 27.5 | 30 |
|---|---|---|---|---|---|---|---|---|---|
| 17 | | | −11.01 | −11.45 | −11.96 | −11.07 | −10.89 | −9.53 | 7.33 |
| 18 | | | −10.59 | −11.36 | −11.64 | −10.99 | −10.54 | −8.55 | 8.33 |
| 19 | | | −11.51 | −12.53 | −12.2 | −12.05 | −11 | −9.19 | 7.94 |
| 20 | | | −10.92 | −12.69 | −13.34 | −12.55 | −12.46 | −10.19 | 2.87 |
| 22 | | | | −10.87 | −11.56 | −11.48 | −10.17 | −8.15 | −1.53 |
| 23 | | | −10.57 | −11.21 | −11.67 | −11.3 | −10.07 | −8.59 | 4.15 |
| 24 | | | −10.83 | −12.14 | −12.83 | −12.54 | −12.71 | −10.67 | 7.9 |
| 25 | | | −11.07 | −11.89 | −12.22 | −11.51 | −11.49 | −11.51 | 1.9 |
| C1 | | | −8.68 | −8.38 | −7.67 | −6.02 | −3.42 | 0.01 | 9.88 |

Table 9-600° F.

TABLE 9A

Part Density as Molded (g/cc)

Oven Time (minutes)

| Blend | 10 | 12.5 | 15 | 17.5 | 20 | 22.5 |
|---|---|---|---|---|---|---|
| 17 |  | 0.9327 | 0.9431 | 0.9483 | 0.9482 | 0.9486 |
| 18 |  | 0.928 | 0.9396 | 0.9453 | 0.9483 | 0.9482 |
| 19 |  | 0.926 | 0.9365 | 0.9446 | 0.9454 | 0.9452 |
| 20 |  | 0.928 | 0.9354 | 0.9433 | 0.9448 | 0.9454 |
| 22 |  |  | 0.931 | 0.9378 | 0.946 | 0.946 |
| 23 |  | 0.93 | 0.9384 | 0.9459 | 0.9482 | 0.948 |
| 24 |  | 0.9253 | 0.9386 | 0.9441 | 0.9452 | 0.9451 |
| 25 |  | 0.9263 | 0.9385 | 0.9439 | 0.9461 | 0.946 |
| C1 |  | 0.9184 | 0.919 | 0.9264 | 0.9426 | 0.9428 |

TABLE 9B

Impact Strength (Dynatup Impact Energy at −40° C., ft-lb)

Oven Time (minutes)

| Blend | 10 | 12.5 | 15 | 17.5 | 20 | 22.5 |
|---|---|---|---|---|---|---|
| 17 |  | 74.1 | 78.4 | 87.3 | 87.2 | 85 |
| 18 |  | 71.5 | 78.2 | 93.2 | 88.7 | 84 |
| 19 |  | 60.8 | 78.6 | 76.8 | 88.5 | 82.1 |
| 20 |  | 50.2 | 69.4 | 72.8 | 78.3 | 73.4 |
| 22 |  |  | 68 | 71.5 | 75.9 | 74.5 |
| 23 |  | 54.6 | 69.7 | 74 | 78.4 | 76 |
| 24 |  | 42.8 | 75.7 | 77.6 | 84.8 | 76.3 |
| 25 |  | 58.1 | 78 | 74 | 86.7 | 74.5 |
| C1 |  | 38.1 | 66.5 | 63.4 | 85 | 77.6 |

TABLE 9C

Stiffness (1% Flexural Secant Modulus, MPa)

Oven Time (minutes)

| Blend | 10 | 12.5 | 15 | 17.5 | 20 | 22.5 |
|---|---|---|---|---|---|---|
| 17 |  | 851 | 922 | 961 | 947 | 878 |
| 18 |  | 832 | 872 | 871 | 930 | 865 |
| 19 |  | 755 | 813 | 919 | 829 | 829 |
| 20 |  | 686 | 775 | 855 | 856 | 834 |
| 22 |  |  | 841 | 785 | 831 | 860 |
| 23 |  | 784 | 892 | 945 | 956 | 909 |
| 24 |  | 656 | 857 | 879 | 826 | 849 |
| 25 |  | 721 | 867 | 911 | 888 | 885 |
| C1 |  | 723 | 774 | 753 | 799 | 780 |

TABLE 9D

Colour (Yellowness Index Measured on Inside of Part)

Oven Time (minutes)

| Blend | 10 | 12.5 | 15 | 17.5 | 20 | 22.5 |
|---|---|---|---|---|---|---|
| 17 |  | −11.84 | −12.9 | −11.68 | −9.29 | 23.72 |
| 18 |  | −10.86 | −10.96 | −11.41 | −9.76 | 19.93 |
| 19 |  | −11.62 | −13.03 | −12.33 | −10.55 | −11.84 |
| 20 |  | −12.14 | −12.81 | −13.48 | −12.11 | 7.81 |
| 22 |  |  | −11.24 | −10.89 | −8.04 | 14.29 |
| 23 |  | −10.6 | −11.27 | −11.12 | −7.78 | 9.44 |
| 24 |  | −11.7 | −12.32 | −13.85 | −8.16 | 15.47 |

TABLE 9D-continued

Colour (Yellowness Index Measured on Inside of Part)

Oven Time (minutes)

| Blend | 10 | 12.5 | 15 | 17.5 | 20 | 22.5 |
|---|---|---|---|---|---|---|
| 25 |  | −10.99 | −12.12 | −12.19 | −5.49 | 17.49 |
| C1 |  | −8.47 | −7.6 | −6.38 | 5 | 14.6 |

EXAMPLE 4

This example illustrates that modules (stiffness) may be increased through the use of a third blend component having a higher molecular weight and higher density.

A series of 10 resin blends was initially prepared using a modified dual reactor solution polymerization process. The first two blend components were substantially the same as the two blend components of Example 3 (i.e. the first reactor, which operated at a lower polymerization temperature and a higher comonomer concentration, was used to prepare about 30 weight % of the blends and this blend component had a higher molecular weight and lower density than the second blend component; and the second blend component, comprising about 60 weight % of the blends was produced in the second reactor and had a lower molecular weight and higher density than the first blend component). The third blend component (about 5% of the blends) was produced in the second reactor as a result of imperfect mixing in the second reactor leading to temperature and comonomer gradients (specifically, a zone of lower temperature and lower octene concentration). The third blend component had a higher molecular weight and higher density than the second blend component.

The 10 resin blends (shown in Table 10 as blends P1 to P10) each had a density within the narrow range of from 0.942 to 0.944 g/cc and a melt index $I_2$, between 1.68 and 1.86. The average secant modulus (a good indicator of the stiffness of the rotomolded part) is 848 mPa.

Four resin blends from Example 3 have densities within the 0.942 to 0.944 g/cc range of blends P1 to P10 (see blends 17, 18, 23 and 25). The average flex modulus of blends 17, 18, 23 and 25 (of Example 3) was only 797 mPa (in comparison to the average value of 848 mPa for the 10 blends of this example).

One further resin blend was then prepared using the modified dual reactor solution polymerization process described above. This resin blend had a melt index $I_2$ of 5.33; a density of about 0.940 g/cc; a number average molecular weight Mn of 27.8; a weight average molecular weight The resin blend was compounded with an additive package comprising hydroxyl amine, phosphile and hindered amine (blend 12). An acid scavenger (zinc stearate) was also included in blend 12B.

Blends 12 and 12B were then rotomolded at 520° F. using the procedures as a generally described in Example 1. Properties of the resulting parts are shown in Tables 11A to 11E. Once again, none of the parts was severely warped.

Tables 11A through 11C also include comparative data from molded parts which were prepared at the same time (using the same conditions) as the P12 and P12B blends. The comparative parts (shown as C3) were prepared using a conventional rotomolding resin sold under the tradename NOVAPOL TR 0535. This comparative resin is produced using a conventional Zeigler Natta catalyst and has a melt index, $I_2$, of about five and a density of about 0.935 g/cc.

TABLE 10

| SPP Blends | 15 | 16 | 17 | 18 | 19 | 20 | 21 | 22 | 23 | 24 | 25 |
|---|---|---|---|---|---|---|---|---|---|---|---|
| Melt Index $I_2$ (g/10 min) | 1.48 | 0.97 | 1.82 | 1.60 | 1.44 | 1.50 | 2.07 | 1.15 | 1.62 | 1.57 | 1.54 |
| Stress Exponent | 1.25 | 1.25 | 1.27 | 1.28 | 1.24 | 1.26 | 1.25 | 1.25 | 1.30 | 1.24 | 1.23 |
| Density (g/cm³) | 0.9446 | 0.9451 | 0.9439 | 0.9437 | 0.9414 | 0.9404 | 0.9402 | 0.9417 | 0.9434 | 0.941 | 0.9422 |
| Flex Secant Mod. 1% (MPa) | 810 | 883 | 806 | 814 | 747 | 761 | 714 | 758 | 806 | 752 | 762 |

| PE2 Blends | P1 | P2 | P3 | P4 | P5 | P6 | P7 | P8 | P9 | P10 |
|---|---|---|---|---|---|---|---|---|---|---|
| Melt Index $I_2$ (g/10 min) | 1.73 | 1.73 | 1.69 | 1.68 | 1.7 | 1.88 | 1.8 | 1.78 | 1.78 | 1.86 |
| Stress Exponent | 1.23 | 1.22 | 1.23 | 1.22 | 1.23 | 1.24 | 1.27 | 1.28 | 1.27 | 1.26 |
| Density (g/cm³) | 0.9433 | 0.9426 | 0.943 | 0.9425 | 0.9429 | 0.9429 | 0.9436 | 0.9433 | 0.9434 | 0.9429 |
| Flex Secant Mod. 1% (MPa) | 833 | 867 | 810 | 867 | 823 | 800 | 872 | 861 | 899 | 849 |

Table 11-520° F.

TABLE 11A

Part Density as Molded (g/cc)

| | Oven Time (minutes) | | | | | |
|---|---|---|---|---|---|---|
| Blend | 12.5 | 15 | 20 | 25 | 30 | 35 |
| P12 | 0.9327 | 0.9401 | 0.9413 | 0.9407 | 0.9409 | 0.9413 |
| P12B | 0.9291 | 0.9388 | 0.9409 | 0.941 | 0.9413 | 0.9411 |
| C3 | 0.917 | 0.919 | 0.9269 | 0.9351 | 0.9357 | 0.9362 |

TABLE 11B

Impact Strength (Dynatup Impact Energy at −40° C., ft-lb)

| | Oven Time (minutes) | | | | | |
|---|---|---|---|---|---|---|
| Blend | 12.5 | 15 | 20 | 25 | 30 | 35 |
| P12 | 66.94 | 79.46 | 84.39 | 86.39 | 80 | 83.44 |
| P12B | 62.66 | 75.65 | 82.4 | 61.8 | 83.67 | 83.22 |
| C3 | 42.1 | 55.6 | 50.42 | 79.94 | 78.47 | 79.92 |

TABLE 11C

% Ductility at t −40° C. (%)

| | Oven Time (minutes) | | | | | |
|---|---|---|---|---|---|---|
| Blend | 12.5 | 15 | 20 | 25 | 30 | 35 |
| P12 | 100 | 100 | 100 | 100 | 100 | 100 |
| P12B | 100 | 100 | 100 | 100 | 100 | 100 |
| C3 | 0 | 50 | 0 | 100 | 100 | 100 |

TABLE 11D

Stiffness (1% Flexural Secant Modulus, MPa)

| | Oven Time (minutes) | | | | | |
|---|---|---|---|---|---|---|
| Blend | 12.5 | 15 | 20 | 25 | 30 | 35 |
| P12 | 730 | 732 | 783 | 840 | 742 | 771 |
| P12B | 784 | 826 | 764 | 782 | 672 | 755 |
| C3 | 614 | 608 | 595 | 585 | 517 | 557 |

TABLE 11E

Colour (Yellowness Index Measured on Outside of Part)

| | Oven Time (minutes) | | | | | |
|---|---|---|---|---|---|---|
| Blend | 12.5 | 15 | 20 | 25 | 30 | 35 |
| P12 | −14.55 | −15.4 | −14.5 | −12.33 | −4.35 | 0.8 |
| P12B | −13.82 | −15.51 | −14.62 | −13.95 | −7.61 | 0.6 |
| C3 | −11.68 | −11.94 | −12.32 | −4 | 4.62 | 10.63 |

What is claimed is:

1. A rotomolding process comprising (i) preparing a polymer blend comprising a plurality of thermoplastic linear ethylene copolymer blend components wherein each blend component has a homogeneous comonomer distribution and a molecular weight distribution, Mw/Mn, of less than 3 and wherein said polymer blend has an overall molecular weight distribution, Mw/Mn, of less than or equal to 3.0 and a density of from 0.930 g/cc to 0.950 g/cc; and (ii) subjecting said polymer blend to rotational molding.

2. The process of claim 1 wherein said polymer blend is further characterized by having a density of from 0.935 g/cc to 0.945 g/cc and a melt index, $I_2$, of from 1 to 7 grams per 10 minutes.

3. The process of claim 1 wherein said polymer blend is further characterized by including at least one third blend component having a higher molecular weight and a higher density than said first blend component.

4. The process of claim 3 wherein said polymer blend is further characterized by comprising, based on 100 weight % of said blend components:
   i) from 35 to 65 weight % of said first blend component;
   ii) from 35 to 65 weight % of said at least one second blend component; and
   iii) from 2 to 10 weight % of said at least one third blend component.

5. The process of claim 1 wherein said rotational molding is undertaken at a temperature between 250° C. and 400° C.

* * * * *